(12) United States Patent  
Nagamine et al.

(10) Patent No.: US 8,755,603 B2  
(45) Date of Patent: Jun. 17, 2014

(54) INFORMATION PROCESSING APPARATUS PERFORMING CHARACTER RECOGNITION AND CORRECTION AND INFORMATION PROCESSING METHOD THEREOF

(75) Inventors: Takeshi Nagamine, Kanagawa (JP); Tsutomu Abe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 148 days.

(21) Appl. No.: 13/399,074

(22) Filed: Feb. 17, 2012

(65) Prior Publication Data

US 2013/0070964 A1    Mar. 21, 2013

(30) Foreign Application Priority Data

Sep. 21, 2011    (JP) .................................. 2011-205615

(51) Int. Cl.
*G06K 9/34*    (2006.01)

(52) U.S. Cl.
USPC ............................ 382/177; 382/190; 382/103

(58) Field of Classification Search
None
See application file for complete search history.

(56) References Cited

U.S. PATENT DOCUMENTS

| 2004/0057619 A1* | 3/2004 | Lim et al. ....................... 382/182 |
| 2005/0120391 A1* | 6/2005 | Haynie et al. ................. 725/135 |
| 2008/0123915 A1* | 5/2008 | Nagy ............................. 382/128 |
| 2010/0227630 A1* | 9/2010 | Takala et al. .................. 455/466 |
| 2011/0110647 A1* | 5/2011 | Prorock et al. ................ 386/264 |
| 2013/0070964 A1* | 3/2013 | Nagamine et al. ............. 382/103 |

FOREIGN PATENT DOCUMENTS

| JP | 4-115384 A    | 4/1992 |
| JP | 2001-285716 A | 10/2001 |

OTHER PUBLICATIONS

Sato, T., Kanade, T., Hughes, E. K., Smith, M. A., & Satoh, S. I. (1999). Video OCR: indexing digital news libraries by recognition of superimposed captions. Multimedia Systems, 7(5), 385-395.*

* cited by examiner

*Primary Examiner* — Tahmina Ansari
(74) *Attorney, Agent, or Firm* — Sughrue Mion, PLLC

(57) ABSTRACT

An information processing apparatus includes an identifying unit, a character recognition unit, an obtaining unit, a correcting unit, and an output unit. The identifying unit identifies a still image included in a moving image. The character recognition unit performs character recognition on the still image identified by the identifying unit. The obtaining unit obtains information about the moving image. The correcting unit corrects, on the basis of the information obtained by the obtaining unit, a character recognition result generated by the character recognition unit. The output unit outputs the character recognition result corrected by the correcting unit in association with the moving image.

9 Claims, 18 Drawing Sheets

| ID | TYPE OF CONTEXT | VALUE OF CONTEXT | KEYWORD GROUP |
|---|---|---|---|
| 1 | PERSON | PERSON A | SECURITY/ AUTHENTICATION/ CODE/ACCESS |
| 2 | PERSON | PERSON B | ... |
| 3 | PERSON | PERSON C | ... |

FIG. 8

| ID | TYPE OF CONTEXT | VALUE OF CONTEXT | KEYWORD GROUP |
|---|---|---|---|
| 10 | MOVING IMAGE ID/ PAGE NUMBER | A123, 001 | SECURITY |
| 11 | MOVING IMAGE ID/ PAGE NUMBER | A123, 002 | SECURITY/ AUTHENTICATION |
| 12 | MOVING IMAGE ID/ PAGE NUMBER | A123, 003 | AUTHENTICATION/ CODE/ACCESS |

FIG. 10

| ID | TYPE OF CONTEXT | VALUE OF CONTEXT | KEYWORD GROUP |
|---|---|---|---|
| 20 | LECTURER'S NAME | KOTARO YAMAKAMI | INFORMATION/ CODING |
| 21 | LECTURER'S NAME | CHUTARO YAMANAKA | HISTORY/ EDO PERIOD |
| 22 | LECTURER'S NAME | SHOTARO YAMASHITA | ECONOMY/ INFLATION |

FIG. 12

| TIME SLOT | MON | TUE | WED | ... |
|---|---|---|---|---|
| 1<br>9:00-9:30 | ECONOMY I<br>A102 | FINANCE III<br>A101 | INTRODUCTION TO BUSINESS MANAGEMENT<br>C201 | ... |
| 2<br>9:40-11:00 | COMMERCIAL LAW II<br>A202 | BUSINESS LAW I<br>B201 | WORLD ECONOMY<br>A201 | ... |
| ... | ... | ... | ... | ... |

| ID | TYPE OF CONTEXT | VALUE OF CONTEXT | KEYWORD GROUP |
|---|---|---|---|
| 30 | LECTURE TITLE | ECONOMY I | ECONOMY/MARKET/ECONOMIC/GDP |
| 31 | LECTURE TITLE | ECONOMY II | DEMAND/SUPPLY/DEFLATION/INFLATION |
| 32 | LECTURE TITLE | FINANCE I | ROE/ROA/OWN CAPITAL |

| ID | TYPE OF CONTEXT | KEYWORD GROUP |
|---|---|---|
| 40 | TEXT GROUP | SECURITY, SAFETY |
| 41 | TEXT GROUP | AUTHENTICATION/ CERTIFYING AUTHORITY |
| 42 | TEXT GROUP | AUTHENTICATION/ CODE/ACCESS |

| ID | TYPE OF CONTEXT | VALUE OF CONTEXT | KEYWORD GROUP |
|---|---|---|---|
| 50 | PERSON'S NAME | A SATO | SECURITY/SAFETY |
| 51 | PERSON'S NAME | BKO YAMADA | DEMAND/SUPPLY/MARKET/INDEX |
| 52 | LECTURE TITLE | ECONOMY II | AUTHENTICATION/CODE/ACCESS |

INFORMATION PROCESSING APPARATUS PERFORMING CHARACTER RECOGNITION AND CORRECTION AND INFORMATION PROCESSING METHOD THEREOF

CROSS-REFERENCE TO RELATED APPLICATIONS

This application is based on and claims priority under 35 USC 119 from Japanese Patent Application No. 2011-205615 filed Sep. 21, 2011.

BACKGROUND (i) Technical Field

The present invention relates to an information processing apparatus, an information processing method, and a non-transitory computer readable medium.

(ii) Related Art

Technologies for character recognition are available.

SUMMARY

According to an aspect of the invention, there is provided an information processing apparatus including an identifying unit, a character recognition unit, an obtaining unit, a correcting unit, and an output unit. The identifying unit identifies a still image included in a moving image. The character recognition unit performs character recognition on the still image identified by the identifying unit. The obtaining unit obtains information about the moving image. The correcting unit corrects, on the basis of the information obtained by the obtaining unit, a character recognition result generated by the character recognition unit. The output unit outputs the character recognition result corrected by the correcting unit in association with the moving image.

BRIEF DESCRIPTION OF THE DRAWINGS

Exemplary embodiment(s) of the present invention will be described in detail based on the following figures, wherein:

FIG. 8 is a diagram illustrating an example of the data structure of a moving image ID/page number keyword group table;

FIG. 10 is a diagram illustrating an example of the data structure of a lecturer's name keyword group table;

FIG. 12 is a diagram illustrating an example of the data structure of a timetable;

DETAILED DESCRIPTION

Hereinafter, an exemplary embodiment of the present invention will be described with reference to the drawings.

Figure 1:
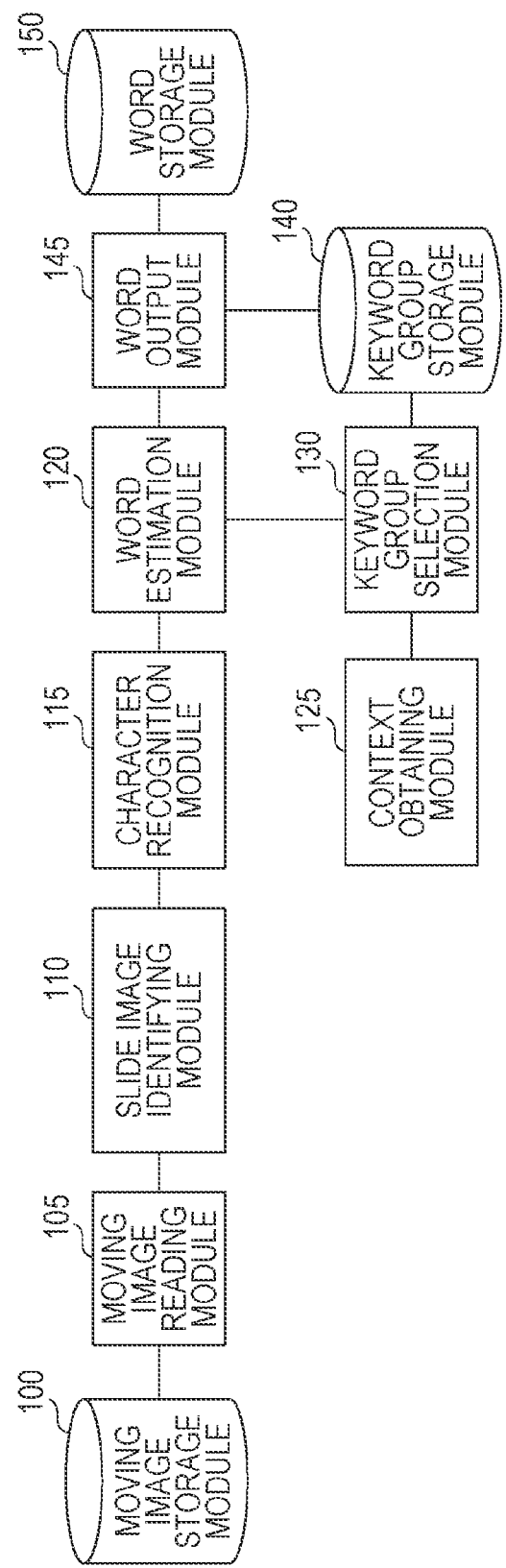
FIG. 1 is a conceptual module configuration diagram illustrating an example configuration according to an exemplary embodiment.

FIG. 1 is a conceptual module configuration diagram illustrating an example configuration according to the exemplary embodiment.

In general, "modules" are components of software (computer program) or hardware that may be logically separated from one another. Accordingly, the modules according to the exemplary embodiment correspond to not only modules in a computer program but also modules in a hardware configuration. Therefore, the description of the exemplary embodiment includes a description of a computer program for causing a computer to function as those modules (a program for causing a computer to execute individual program steps, a program for causing a computer to function as individual units, or a program for causing a computer to realize individual functions), a system, and a method. For the convenience of description, expressions "store", "cause . . . to store", and expressions equivalent thereto will be used. These expressions specifically mean "cause a storage device to store" or "perform control to cause a storage device to store" in the case of a computer program. The modules may correspond to functions in a one-to-one relationship. In terms of packaging, a single module may be constituted by a single program, plural modules may be constituted by a single program, or a single module may be constituted by plural programs. Also, plural modules may be executed by a single computer, or a single module may be executed by plural computers in a distributed or parallel environment. Alternatively, a single module may include another module. Hereinafter, "connection" is used to refer to a logical connection (transmission and reception of data, an instruction, a reference relationship between pieces of data, etc.), as well as a physical connection. "Predetermined" means being determined before a certain operation, and includes the meaning of being determined in accordance with a present situation/state or in accordance with a previous situation/state before a certain operation after processing according to the exemplary embodiment starts, as well as before processing according to the exemplary embodiment starts. A description having the meaning "in the case of A, B is performed" is used as the meaning "whether A or not is determined, and B is performed if it is determined A", except for a case where determination of whether A or not is unnecessary.

A system or apparatus may be realized by plural computers, hardware units, devices, or the like connected to one another via a communication medium, such as a network (including communication connections having a one-to-one correspondence), or may be realized by a single computer, hardware unit, device, or the like. "Apparatus" and "system" are used synonymously. Of course, "system" does not include a man-made social "organization" (social system).

Also, target information is read from a storage device in individual processing operations performed by respective modules or in individual processing operations performed by a single module. After each processing operation has ended, the processing result thereof is written into the storage device. Thus, a description of reading from the storage device before a processing operation and writing into the storage device after a processing operation may be omitted. Here, examples of the storage device include a hard disk, a random access memory (RAM), an external storage medium, a storage device connected through a communication line, a register in a central processing unit (CPU), and the like.

An information processing apparatus according to the exemplary embodiment associates information with a moving image. As illustrated in FIG. 1, the information processing apparatus includes a moving image storage module 100, a moving image reading module 105, a slide image identifying module 110, a character recognition module 115, a word estimation module 120, a context obtaining module 125, a keyword group selection module 130, a keyword group storage module 140, a word output module 145, and a word storage module 150.

Information is associated with a moving image so that it is easy to search for the moving image using the information. The exemplary embodiment may be utilized in, for example, a system for analyzing a moving image of a scene of a lecture, extracting and indexing a character string, and enabling a text-based search for the moving image. More specifically, the exemplary embodiment enables, in a case where a captured moving image includes a scene of slide projection, extraction and indexing of a character string included in a slide image and searching for the moving image.

The moving image storage module 100 is connected to the moving image reading module 105. The moving image storage module 100 is accessed by the moving image reading module 105, and stores a moving image (moving image data). The moving image may be a color image or a monochrome image. Also, the moving image may include sound. The moving image includes a still image including characters, for example, an image of a lecture or presentation using a slide image. Here, the still image is an image of a still segment corresponding to a predetermined time period or more in a captured moving image, for example, an image of a slide image used in the foregoing lecture or the like. Hereinafter, a still image is also referred to as a slide image, but the term "still image" is not limited to a slide image.

The moving image reading module 105 is connected to the moving image storage module 100 and the slide image identifying module 110. The moving image reading module 105 reads a target moving image among the moving images stored in the moving image storage module 100, and supplies the read moving image to the slide image identifying module 110.

The slide image identifying module 110 is connected to the moving image reading module 105 and the character recognition module 115. The slide image identifying module 110 identifies a still image included in a target moving image. For example, the slide image identifying module 110 extracts an image of a slide image from a moving image. Specifically, the slide image identifying module 110 calculates a difference in pixel value between sequential frames included in a frame sequence of a moving image. The slide image identifying module 110 identifies a set of plural frames determined to be a still image in the frame sequence on the basis of a result of comparison between the calculated difference and a predetermined threshold. More specifically, when the calculated difference is smaller than/equal to or smaller than the predetermined threshold, the image of the corresponding segment (an entire image in a frame or a part of an image satisfying the above-described condition in the frame) is identified as being a still image. Here, "between frames" means between frames with a predetermined time period or more therebetween. Also, "between frames" means between frames adjacent to each other. If it is detected that an event in which a difference in pixel value is smaller than/equal to or smaller than the predetermined threshold has occurred between sequential frames corresponding to the predetermined time period or more, the slide image identifying module 110 may identify the image corresponding to the segment as being a still image.

Furthermore, the following conditions may be added as conditions for identifying a still image: an image having a rectangular shape, and an image having a percentage higher than/equal to or higher than a predetermined percentage of an area of a predetermined color (e.g., white).

The character recognition module 115 is connected to the slide image identifying module 110 and the word estimation module 120. The character recognition module 115 performs character recognition on a still image identified by the slide image identifying module 110. For example, the character recognition module 115 recognizes characters in a slide image used in a lecture. The character recognition may be performed using an existing character recognition technique.

The context obtaining module 125 is connected to the keyword group selection module 130. The context obtaining module 125 obtains information about a moving image read by the moving image reading module 105. The processes performed by the context obtaining module 125 correspond to the modules included in the context obtaining module 125 illustrated in FIG. 2 or 3, which will be described below.

The keyword group selection module 130 is connected to the word estimation module 120, the context obtaining module 125, and the keyword group storage module 140. The keyword group selection module 130 selects, from the keyword group storage module 140, a keyword group associated with the information obtained by the context obtaining module 125.

The keyword group storage module 140 is connected to the keyword group selection module 130 and the word output module 145. The keyword group storage module 140 is accessed by the keyword group selection module 130 and the word output module 145, and stores keyword groups. The keyword groups stored in the keyword group storage module 140 will be described below with reference to FIGS. 2, 3, 6, 8, 10, 13, 17, and 20.

The word estimation module 120 is connected to the character recognition module 115, the keyword group selection module 130, and the word output module 145. The word estimation module 120 corrects a character recognition result generated by the character recognition module 115 on the basis of information obtained by the context obtaining module 125 or the keyword group selection module 130. For example, the word estimation module 120 performs morphological analysis on a character string, which is a character recognition result generated by the character recognition module 115, and supplies a character string recognized as a word, which serves as a candidate word to be given to a moving image, to the word output module 145. If a character string as a character recognition result includes a keyword similar to any one of keywords selected by the keyword group selection module 130, the word estimation module 120 supplies the keyword, which serves as a candidate word to be given to a moving image, to the word output module 145.

The word output module 145 is connected to the word estimation module 120, the keyword group storage module 140, and the word storage module 150. The word output module 145 outputs a character recognition result corrected by the word estimation module 120, in association with a target moving image. For example, the word output module 145 stores a word received from the word estimation module 120 in the word storage module 150 in order to perform indexing of a target moving image, stores context information obtained by the context obtaining module 125 and a word received from the word estimation module 120 in the keyword group storage module 140 in association with each other, and updates the information stored in the keyword group storage module 140.

The word storage module 150 is connected to the word output module 145. The word storage module 150 stores a character recognition result supplied from the word estimation module 120 in association with a target moving image. For example, the word storage module 150 is a database that enables searching for a moving image using text as a keyword.

Figure 2:
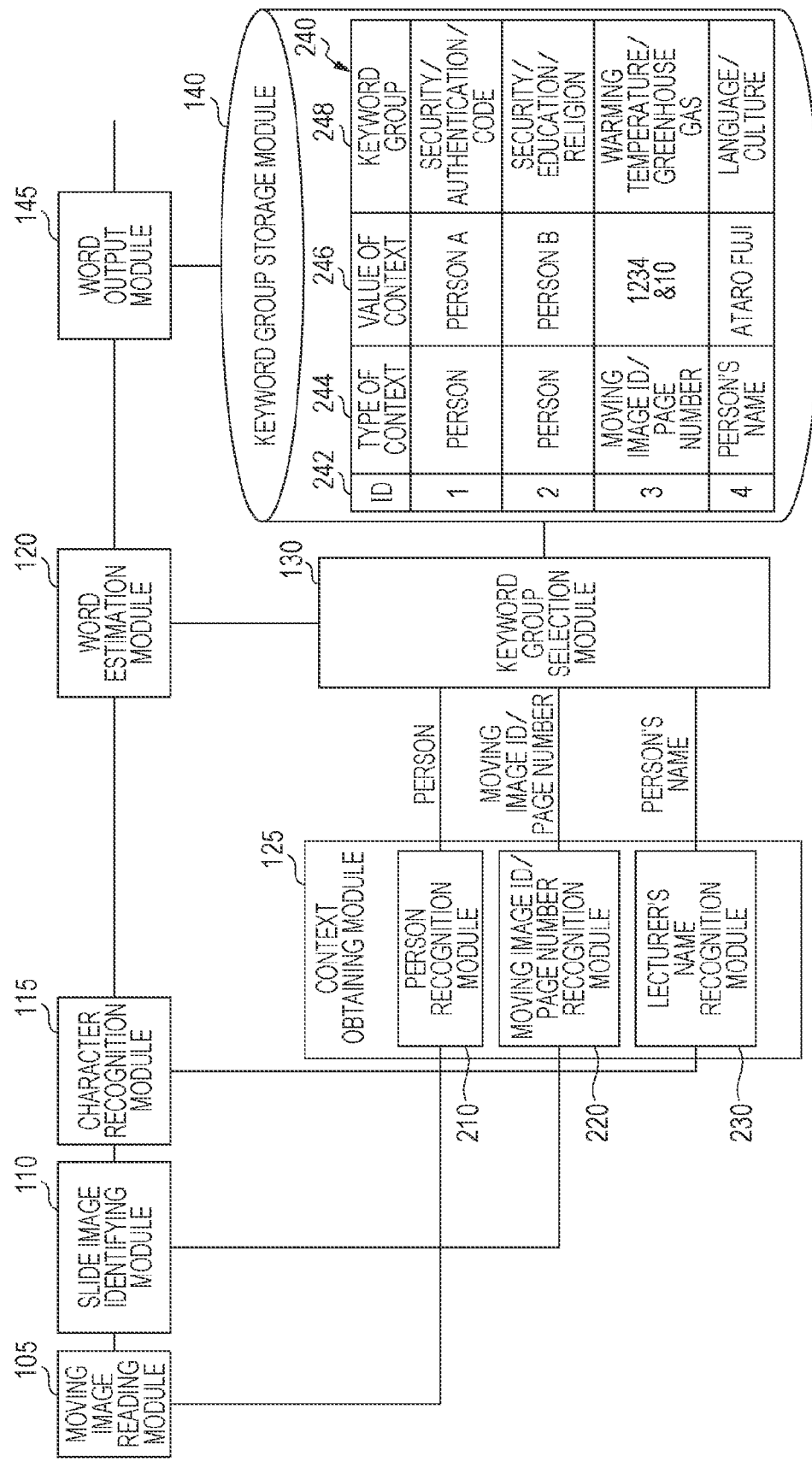
FIG. 2 is a conceptual module configuration diagram illustrating an example configuration according to the exemplary embodiment.

FIG. 2 is a conceptual module configuration diagram illustrating an example configuration according to the exemplary embodiment. Specifically, FIG. 2 illustrates the details of the context obtaining module 125 illustrated in FIG. 1. In FIG. 2, the same parts as those in FIG. 1 are denoted by the same reference numerals, and the corresponding description will be omitted.

The moving image reading module 105 is connected to the slide image identifying module 110, and a person recognition module 210 in the context obtaining module 125.

The slide image identifying module 110 is connected to the moving image reading module 105, the character recognition module 115, and a moving image ID/page number recognition module 220 in the context obtaining module 125.

The character recognition module 115 is connected to the slide image identifying module 110, the word estimation module 120, and a lecturer's name recognition module 230 in the context obtaining module 125.

The context obtaining module 125 includes at least one of the person recognition module 210, the moving image ID/page number recognition module 220, and the lecturer's name recognition module 230.

The person recognition module 210 is connected to the moving image reading module 105 and the keyword group selection module 130. The person recognition module 210 recognizes a person in a target moving image and obtains information about the person. For example, the person recognition module 210 performs face recognition on a lecturer who appears in a moving image, and obtains face information (information specifying the person, for example, the name or identification information of the person), which is a result of the face recognition, as context information. The details of the process will be described below with reference to FIGS. 4 to 6.

In the case of using a processing result generated by the person recognition module 210, the word estimation module 120 corrects a character recognition result on the basis of information about a person obtained by the person recognition module 210.

The moving image ID/page number recognition module 220 is connected to the slide image identifying module 110 and the keyword group selection module 130. The moving image ID/page number recognition module 220 obtains, on the basis of moving image identification information (hereinafter moving image ID), which is information for identifying a target moving image, and a temporal position of a still image identified by the slide image identifying module 110, character information that is likely to be included in the still image. For example, the moving image ID/page number recognition module 220 obtains the moving image ID of a target moving image, and determines the temporal position in the moving image of the still image extracted by the slide image identifying module 110. The "character information that is likely to be included in the still image" corresponds to characters in a slide image, for example. The details of the process will be described below with reference to FIGS. 7 and 8.

In the case of using a processing result generated by the moving image ID/page number recognition module 220, the word estimation module 120 corrects a character recognition result on the basis of character information obtained by the moving image ID/page number recognition module 220.

The lecturer's name recognition module 230 is connected to the character recognition module 115 and the keyword group selection module 130. The lecturer's name recognition module 230 extracts a person's name included in a result of character recognition performed on a still image at a predetermined temporal position by the character recognition module 115, and obtains information about the person's name. For example, the lecturer's name recognition module 230 recognizes, as a lecturer's name, a person's name included in a character string extracted by the character recognition module 115. Normally, a lecturer's name is described in the first slide image. Thus, a person's name extracted from the first slide image is regarded as a lecturer's name. The details of the process will be described below with reference to FIGS. 9 and 10.

In the case of using a processing result generated by the lecturer's name recognition module 230, the word estimation module 120 corrects a character recognition result generated by the character recognition module 115 on the basis of information about a person's name obtained by the lecturer's name recognition module 230.

The keyword group selection module 130 is connected to the word estimation module 120, the person recognition module 210, the moving image ID/page number recognition module 220, the lecturer's name recognition module 230, and the keyword group storage module 140. The keyword group selection module 130 searches the keyword group storage module 140 in accordance with the type and value of received context information. In the case of having received a person (type) and the value thereof as context information from the person recognition module 210, the keyword group selection module 130 searches for a keyword group corresponding to the person (type). In the case of having received a moving image ID and a page number from the moving image ID/page number recognition module 220, the keyword group selection module 130 searches for a keyword group of the moving image ID corresponding to the moving image ID and page number (type), or a keyword group for around the corresponding page number. In the case of having received a person's name (type) and the value thereof as context information from the lecturer's name recognition module 230, the keyword group selection module 130 searches for a keyword group of a person's name corresponding to the person's name (type).

The keyword group storage module 140 includes a keyword group table 240. The keyword group table 240 includes an ID column 242, a type-of-context column 244, a value-of-context column 246, and a keyword group column 248. The ID column 242 stores numerals for uniquely identifying the information stored in the keyword group table 240. The type-of-context column 244 stores the types of context for determining the keyword group to be searched for. The keyword group corresponds to information received from any one of the person recognition module 210, the moving image ID/page number recognition module 220, and the lecturer's name recognition module 230. The value-of-context column 246 stores the values of context (for example, a person's name, moving image ID, and a page number). The keyword group column 248 stores keyword groups corresponding to the context.

The word estimation module 120 determines the similarity between a character string as a recognition result supplied from the character recognition module 115 and a keyword group selected by the keyword group selection module 130, and outputs one or more keywords having a predetermined threshold or more as candidate words to the word output module 145. Instead of determining the similarity, the word estimation module 120 may output one or more words recognized as words in a process of morphological analysis or the like to the word output module 145. These candidate words are fed back as new values of context to the keyword group storage module 140 by the word output module 145.

Figure 3:
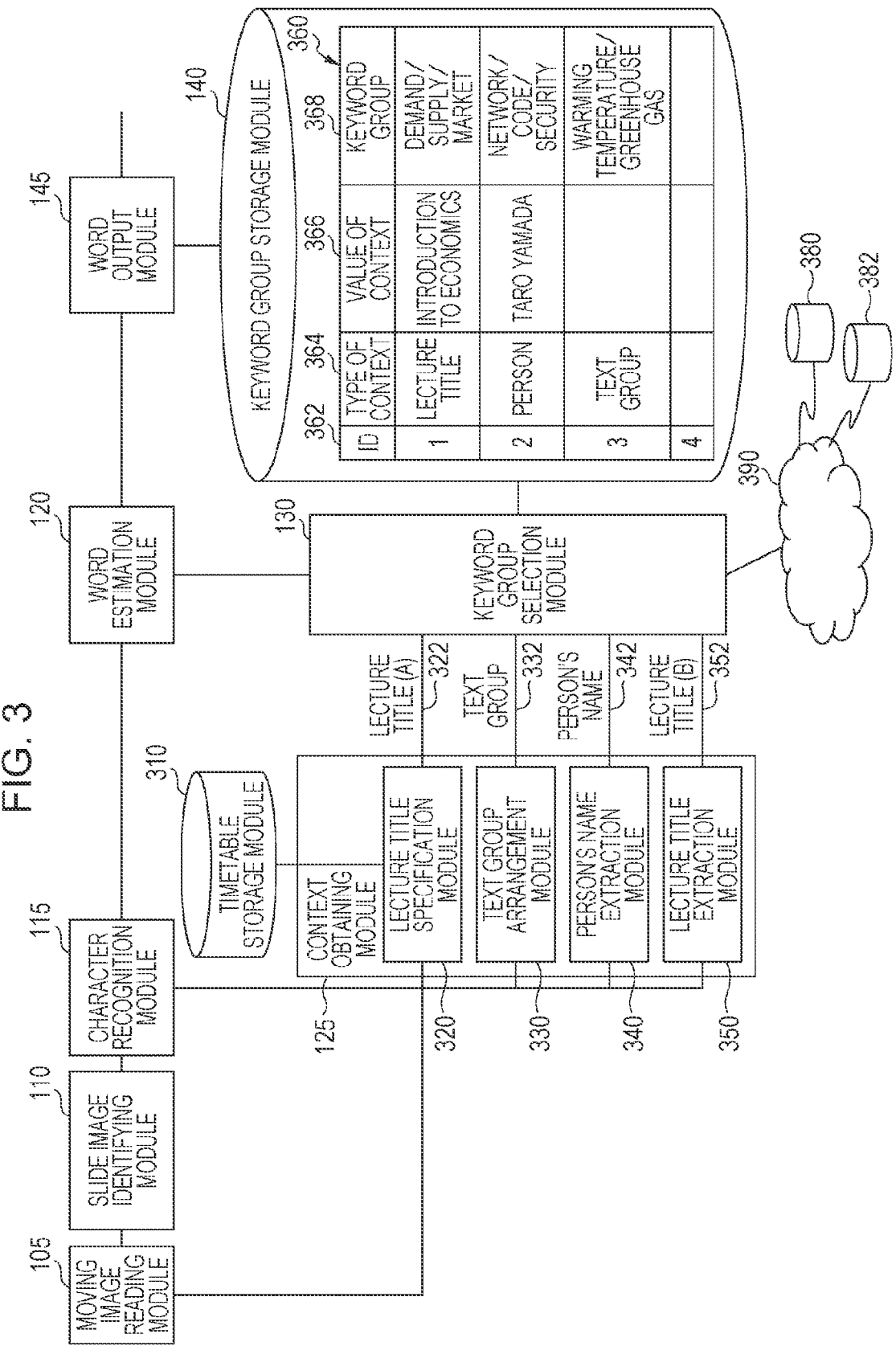
FIG. 3 is a conceptual module configuration diagram illustrating an example configuration according to the exemplary embodiment.

FIG. 3 is a conceptual module configuration diagram illustrating an example configuration according to the exemplary embodiment. Specifically, FIG. 3 illustrates the details of the context obtaining module 125 illustrated in FIG. 1. In FIG. 3, the same parts as those in FIG. 1 are denoted by the same reference numerals, and the corresponding description will be omitted.

The moving image reading module 105 is connected to the slide image identifying module 110 and a lecture title specification module 320.

The slide image identifying module 110 is connected to the moving image reading module 105 and the character recognition module 115.

The character recognition module 115 is connected to the slide image identifying module 110, the word estimation module 120, a text group arrangement module 330, a person's name extraction module 340, and a lecture title extraction module 350.

A timetable storage module 310 is connected to the lecture title specification module 320. The timetable storage module 310 stores days of the week, places (lecture rooms), lecture titles, etc.

The context obtaining module 125 includes at least one of the lecture title specification module 320, the text group arrangement module 330, the person's name extraction module 340, and the lecture title extraction module 350.

The lecture title specification module 320 is connected to the moving image reading module 105, the keyword group selection module 130, and the timetable storage module 310. The lecture title specification module 320 extracts information about a shooting place and shooting date and time of a target moving image, and obtains information about an event that was held in the shooting place on the shooting date and time. Here, an example of the event is a lecture. The lecture title specification module 320 obtains information about a lecture from a lecture schedule (timetable, including places, dates and times, and lecture titles).

For example, the lecture title specification module 320 extracts, from moving image information about a moving image read by the moving image reading module 105, date/time information, which is information about the date and time when the moving image was captured, and place information, which is information about the place where the moving image was captured. In a case where the moving image is stored in the moving image storage module 100 together with date/time information and place information, the lecture title specification module 320 extracts the date/time information and the place information. The date/time information may be obtained on the basis of the recording date and time of a moving image file. The place information may be extracted by extracting the serial number of a camera from the metadata included in the moving image and by using a prepared table in which serial numbers are associated with place information. Then, the lecture title specification module 320 obtains information about the lecture on the basis of the lecture title or class title specified on the basis of the day and time in the date/time information.

The details of the process will be described below with reference to FIGS. 11 to 14.

In the case of using a processing result generated by the lecture title specification module 320, the word estimation module 120 corrects a character recognition result generated by the character recognition module 115 on the basis of information about an event obtained by the lecture title specification module 320.

The text group arrangement module 330 is connected to the character recognition module 115 and the keyword group selection module 130. The text group arrangement module 330 performs morphological analysis on a character recognition result generated by the character recognition module 115, and obtains information about a character string, which is a result of the morphological analysis, or information about a character string similar to the character string. For example, the text group arrangement module 330 arranges a character string received from the character recognition module 115. Examples of the arrangement include extraction of a word using morphological analysis, and cutout of a character string having a predetermined length. The details of the process will be described below with reference to FIGS. 15 to 17.

In the case of using a processing result generated by the text group arrangement module 330, the word estimation module 120 corrects a character recognition result generated by the character recognition module 115 on the basis of information about a character string obtained by the text group arrangement module 330.

The person's name extraction module 340 is connected to the character recognition module 115 and the keyword group selection module 130. The person's name extraction module 340 extracts a person's name included in a character recognition result generated by the character recognition module 115. When there are plural persons' names, the person's name extraction module 340 performs weighting based on the temporal positions of still images, and obtains information about a person's name selected using the result of the weighting. For example, the person's name extraction module 340 extracts a person's name from a character string, which is a character recognition result received from the character recognition module 115. When plural persons' names are extracted, the person's name extraction module 340 receives the numbers of the slide images to be processed, as well as character strings, and performs weighting particularly on the person's name extracted from the first slide image.

In the case of using a processing result generated by the person's name extraction module 340, the word estimation module 120 corrects a character recognition result generated by the character recognition module 115 on the basis of information about a person's name obtained by the person's name extraction module 340.

The lecture title extraction module 350 is connected to the character recognition module 115 and the keyword group selection module 130. The lecture title extraction module 350 extracts an event title included in a character recognition result generated by the character recognition module 115. When there are plural event titles, the lecture title extraction module 350 performs weighting based on the temporal positions of still images, and obtains information about an event title selected using the result of the weighting. For example, the lecture title extraction module 350 extracts a lecture title from a character string, which is a character recognition result received from the character recognition module 115. When plural lecture titles are extracted, the lecture title extraction module 350 receives the numbers of the slide images to be processed, as well as character strings, and performs weighting particularly on the lecture title extracted from the first slide image. Also, the lecture title extraction module 350 performs weighting when a lecture title is at a position where a title is likely to be positioned, such as at the top of a slide image. The details of the processes performed by the person's name extraction module 340 and the lecture title extraction module 350 will be described below with reference to FIGS. 18 to 21.

In the case of using a processing result generated by the lecture title extraction module 350, the word estimation module 120 corrects a character recognition result generated by the character recognition module 115 on the basis of information about an event title obtained by the lecture title extraction module 350.

The keyword group selection module 130 is connected to the word estimation module 120, the lecture title specification module 320, the text group arrangement module 330, the person's name extraction module 340, the lecture title extraction module 350, and the keyword group storage module 140. The keyword group selection module 130 is also connected to a database 380 and a database 382 via a communication line 390. The keyword group selection module 130 searches the keyword group storage module 140 in accordance with the type and value of received context information. In the case of having received a lecture title (type) and the value thereof as context information from the lecture title specification module 320, the keyword group selection module 130 searches for a keyword group corresponding to the lecture title (type). In the case of having received a text group (type) and the value thereof as context information from the text group arrangement module 330, the keyword group selection module 130 performs matching between an arranged character string and a keyword group corresponding to the text group (type), and determines a keyword group that matches by a predetermined threshold or more to be a candidate. In the case of having received a lecture title (type), a person's name (type), and the values thereof as context information from the person's name extraction module 340 and the lecture title extraction module 350, the keyword group selection module 130 searches for a keyword group corresponding to the lecture title (type) and the person's name (type). Alternatively, the keyword group selection module 130 may search the database 380 or the database 382, other than a keyword group table 360 in the keyword group storage module 140.

The keyword group storage module 140 includes the keyword group table 360. The keyword group table 360 includes an ID column 362, a type-of-context column 364, a value-of-context column 366, and a keyword group column 368. The keyword group table 360 is equivalent to the keyword group table 240 illustrated in FIG. 2. However, the keyword group table 360 stores information corresponding to the types of context information supplied from the lecture title specification module 320, the text group arrangement module 330, the person's name extraction module 340, and the lecture title extraction module 350.

The word estimation module 120 determines the similarity between a character string as a recognition result supplied from the character recognition module 115 and a keyword group selected by the keyword group selection module 130, and outputs, as candidate words, one or more keywords having a predetermined threshold or more to the word output module 145. Alternatively, the word estimation module 120 may output, as candidate words, one or more words recognized as words in the process of morphological analysis or the like to the word output module 145, instead of determining the similarity. These candidate words are fed back to (stored in) the keyword group storage module 140 as new values of context by the word output module 145.

Figure 4:
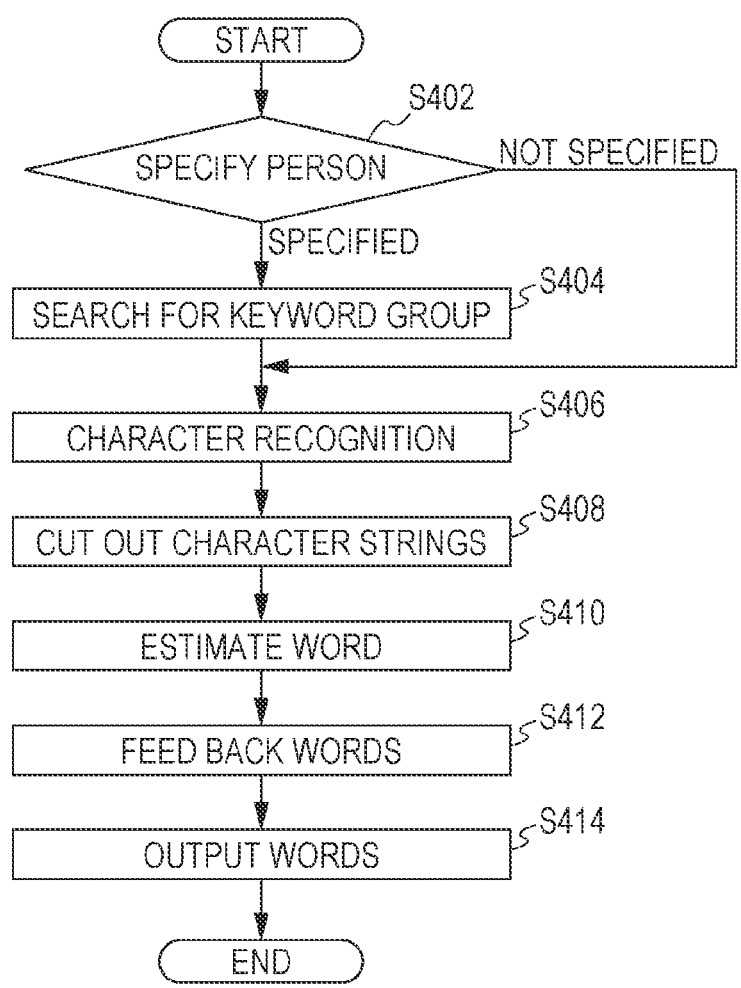
FIG. 4 is a flowchart illustrating an example of a process performed by a person recognition module and so forth according to the exemplary embodiment.

FIG. 4 is a flowchart illustrating an example of a process performed by the person recognition module 210 and so forth according to the exemplary embodiment. The case of using information about a person as context information will be described. Here, the slide image identifying module 110 has already analyzed a moving image and extracted an image of slide projection as a still image (or a still image of a slide image in an image of slide projection).

In step S402, the person recognition module 210 analyzes a moving image and specifies a person. A face recognition technique may be used as a technique of specifying a person. If the result obtained here matches a previously recognized face image, the person recognition module 210 obtains face information about the face image. If a face image is not recognized, the process proceeds to step S406.

In step S404, the keyword group selection module 130 searches the keyword group storage module 140 for a keyword group associated with the obtained face information by using the face information.

In step S406, the character recognition module 115 performs character recognition on the still image.

In step S408, the word estimation module 120 cuts out character strings from a character string, which is a character recognition result. The word estimation module 120 performs morphological analysis on the character string obtained through the character recognition, and cuts out character strings so that each of the character strings has a length of a character string of a keyword obtained through the searching in step S404.

In step S410, the word estimation module 120 extracts a word which has been extracted as a noun as a result of morphological analysis. Furthermore, the word estimation module 120 calculates the similarity between the character strings cut out in step S408 and the keywords included in the keyword group. In this case, the amount of calculation may be reduced by comparing words having the same length. The similarity may be calculated by using a Levenshtein distance and the lengths of words.

In step S412, the word output module 145 stores the word obtained through morphological analysis and the word obtained through calculation of similarity in the keyword group storage module 140.

In step S414, the word output module 145 outputs an analysis result. The analysis result is indexed together with an ID indicating the moving image.

In the process illustrated in the flowchart in FIG. 4, a result of character recognition that is performed on a still image included in a single moving image is corrected. Alternatively, the process may be performed on each of slide images included in a moving image.

Figures 5, 6:
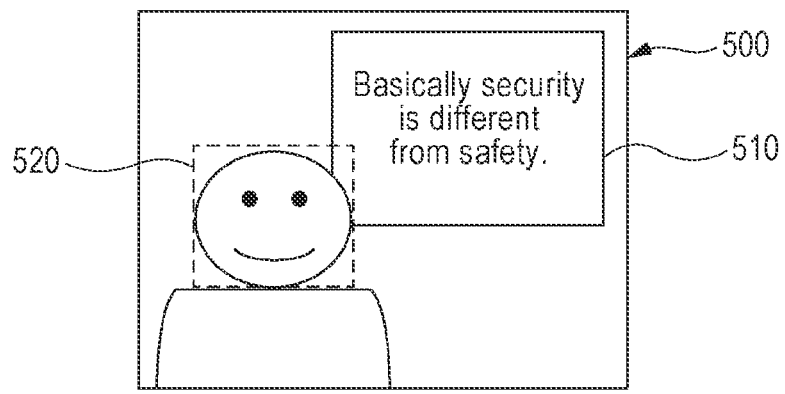
FIG. 5 is a diagram illustrating an example of a moving image, a slide image, and a face region.
FIG. 6 is a diagram illustrating an example of the data structure of a person keyword group table.

More detailed description will be given with reference to FIG. 5. FIG. 5 is a diagram illustrating a moving image 500, a slide image 510, and a face region 520.

The moving image 500 is an image of one frame in a target moving image. The moving image 500 includes the slide image 510 and a person. The slide image identifying module 110 identifies the moving image 500 as being a still image.

In step S402, the person recognition module 210 performs face recognition on the face region 520. For example, it is assumed that the face region 520 is recognized as person A.

In step S404, the keyword group selection module 130 extracts, from the person keyword group table 600 illustrated in FIG. 6, a keyword group (in a keyword group column 608) corresponding to a person as the type of context (in a type-of-context column 604) and person A (in a value-of-context column 606) as the value thereof (result of face recognition). The person keyword group table 600 is equivalent to the keyword group table 240 illustrated in FIG. 2. Here, the keyword group "security, authentication, code, access" in the keyword group column 608 is extracted.

In step S406, the character recognition module 115 performs character recognition on the slide image 510. As a result, it is assumed that the character recognition result "Rasically sacμγify is dihherent frcm safety" is obtained. Such a recognition result is obtained for the following reason. A still image extracted from a moving image has a lower resolution and lower contrast than those of an image obtained by scanning a paper document, and thus it is difficult to perform accurate character recognition thereon.

In step S408, the word estimation module 120 performs morphological analysis on the character recognition result, and extracts the noun "safety".

Then, the lengths of individual character strings in the keyword group extracted in step S404 are counted. In this case, the lengths are eight characters, fourteen characters, four characters, and six characters, respectively. Thus, the character recognition result is divided into four characters, six characters, eight characters, and fourteen characters. As a result, "Rasi, ical, llys, sacμ, μγif, fyis, . . . , rentfrcmsafety" is obtained.

In step S410, the word estimation module 120 compares "sacμγify", which is a character string as a character recognition result and has eight characters, with "security", which is a keyword included in the keyword group. These two character strings are different from each other in four characters "a", "μ", "γ", and "f". Thus, the Levenshtein distance is 4, and the similarity therebetween is 0.5, which is obtained by dividing 4 by the length of the character string, i.e., 8. When the similarity is equal to or smaller than a predetermined threshold, the compared keyword is output as a candidate character string to the word output module 145. For example, when the threshold is 0.5, "security" is output.

In step S412, the word output module 145 stores, in the keyword group storage module 140, the word "safety" obtained through morphological analysis and the keyword "security" obtained through calculation of similarity. That is, "safety" is added to the keyword group column 608 corresponding to "person A" in the person keyword group table 600. "Security" is a keyword that already exists in the keyword group column 608.

In step S414, the word output module 145 adds "safety" and "security" as indexing information to the target moving image.

Figure 7:
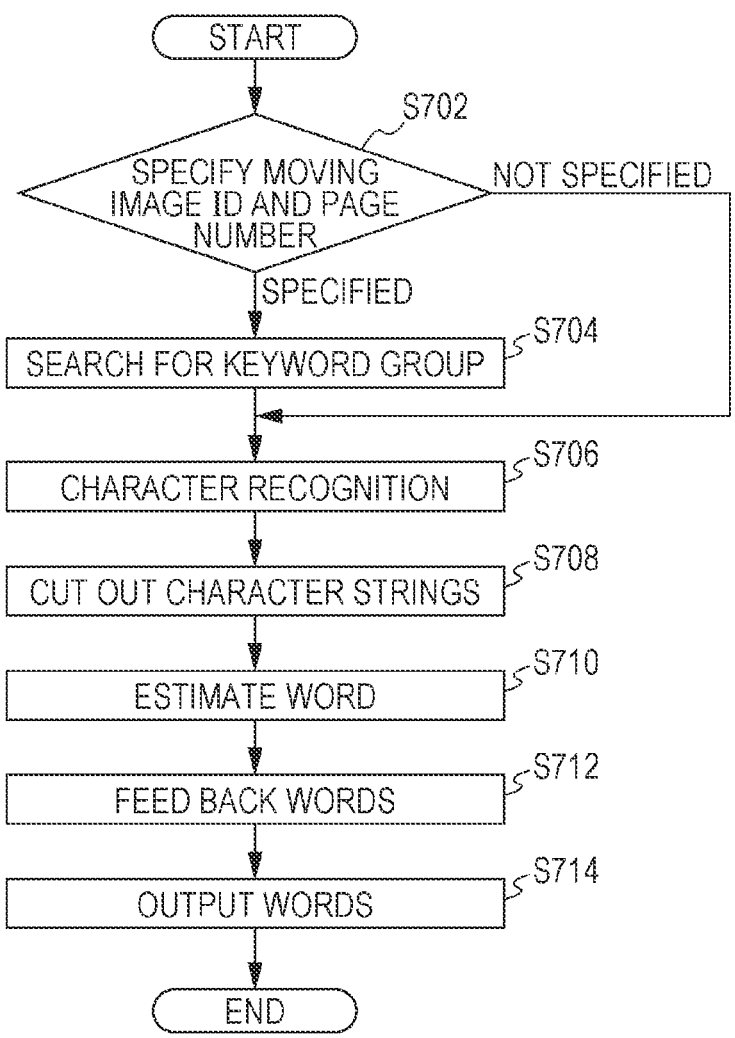
FIG. 7 is a flowchart illustrating an example of a process performed by a moving image ID/page number recognition module and so forth according to the exemplary embodiment.

FIG. 7 is a flowchart illustrating an example of a process performed by the moving image ID/page number recognition module 220 and so forth according to the exemplary embodiment. The case of using a moving image ID and a page number as context information will be described. Here, the slide image identifying module 110 has already analyzed a moving image and extracted an image of slide projection as a still image (or a still image of a slide image in an image of slide projection).

In step S702, the moving image ID/page number recognition module 220 determines whether or not a moving image ID and a page number have been specified. If a moving image ID and a page number have been specified, the process proceeds to step S704. If not have been specified, the process proceeds to step S706. A moving image ID assigned to the moving image to be analyzed is used to specify the moving image ID and page number. As the moving image ID, the ID assigned in advance to the moving image may be used. Alternatively, the moving image ID may be obtained on the basis of the title of the moving image and the shooting date and time of the moving image by using a table that stores titles and shooting dates and times of moving images associated with moving image IDs. The page number indicates the temporal position of a still image extracted as a text extraction target, in the case of analyzing the moving image having the moving image ID. In other words, the page number is the position of the image extracted as a still image. Specifically, when a slide image changes (when a page is turned), a new slide image is extracted as a still image. Thus, the temporal position of each image identified as a still image corresponds to a page number.

In step S704, the keyword group selection module 130 searches the keyword group storage module 140 for a keyword group associated with the moving image ID and the page number by using the moving image ID or the page number.

For example, description will be given of a case where a moving image ID/page number keyword group table 800 is stored in the keyword group storage module 140, the moving image from which a still image has been extracted has a moving image ID A123, and the extracted still image is on the third page. FIG. 8 is a diagram illustrating an example of the data structure of the moving image ID/page number keyword group table 800. The moving image ID/page number keyword group table 800 includes an ID column 802, a type-of-context column 804, a value-of-context column 806, and a keyword group column 808. The moving image ID/page number keyword group table 800 is equivalent to the keyword group table 240, but the type-of-context column 804 stores a moving image ID and a page number.

In the searching for a keyword group performed by the keyword group selection module 130, a keyword group related to the obtained moving image ID A123 and page number 003 is searched for. Plural types of search methods are available. For example, all the pages having a moving image ID of A123 may be searched for (a search using only a moving image ID), and the keyword group column 808 corresponding thereto may be extracted. Alternatively, a page having a moving image ID of A123 and a page number of 003 may be searched for (a search using a moving image ID and page number), and the keyword group column 808 corresponding thereto may be extracted. Alternatively, pages related to a page having a moving image ID of A123 and a page number of 003 may be searched for (for example, predetermined preceding pages, specifically, one page, two pages, or three pages), and the keyword group column 808 corresponding thereto may be extracted. Furthermore, after subsequent pages of still images have been analyzed, not only the preceding pages but also the subsequent pages may be regarded as a target of searching (for example, predetermined subsequent pages, specifically, three pages, four pages, or five pages, or predetermined preceding and subsequent pages, specifically, one page, two pages, three pages, or four pages), and the keyword group column 808 corresponding thereto may be extracted.

The process from step S706 is equivalent to the process from step S406 in the flowchart illustrated in FIG. 4.

In step S706, the character recognition module 115 performs character recognition on the still image.

In step S708, the word estimation module 120 cuts out character strings from a character string, which is a character recognition result.

In step S710, the word estimation module 120 extracts a word which has been extracted as a noun as a result of morphological analysis. Furthermore, the word estimation module 120 calculates the similarity between the character strings cut out in step S708 and the keywords included in the keyword group.

In step S712, the word output module 145 stores the word obtained through morphological analysis and the word obtained through calculation of similarity in the keyword group storage module 140.

In step S714, the word output module 145 outputs an analysis result.

In the process illustrated in the flowchart in FIG. 7, a result of character recognition that is performed on a still image included in a single moving image is corrected. Alternatively, the process may be performed on each of slide images included in a moving image.

Figure 9:
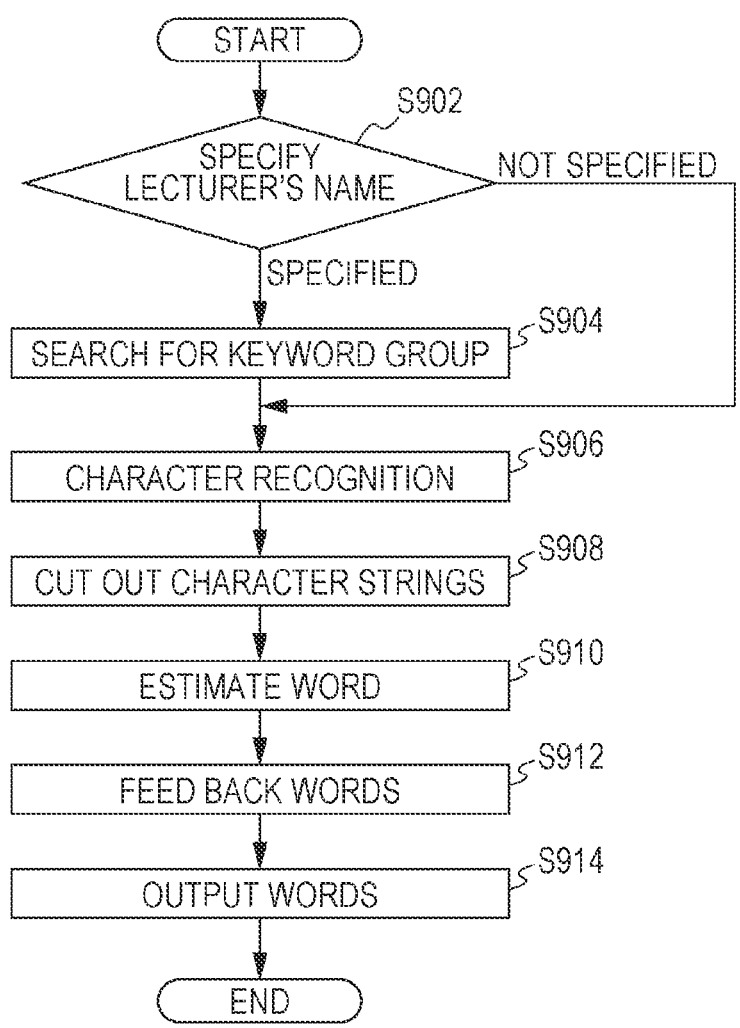
FIG. 9 is a flowchart illustrating an example of a process performed by a lecturer's name recognition module and so forth according to the exemplary embodiment.

FIG. 9 is a flowchart illustrating an example of a process performed by the lecturer's name recognition module 230 and so forth according to the exemplary embodiment. The case of using a lecturer's name as context information will be described. Here, the slide image identifying module 110 has already analyzed a moving image and extracted an image of slide projection as a still image (or a still image of a slide image in an image of slide projection).

In step S902, the lecturer's name recognition module 230 determines whether or not a lecturer's name has been specified. If a lecturer's name has been specified, the process proceeds to step S904. If not has been specified, the process proceeds to step S906. The character recognition module 115 is caused to perform character recognition on the still image having a predetermined page number (for example, 1 or 2). Then, it is determined whether or not the character recognition result includes a lecturer's name that matches a lecturer's name registered in a table that stores lecturers' names in advance (for example, a lecturer's name keyword group table 1000 described below, or a value-of-context column 1006 in the lecturer's name keyword group table 1000). If the character recognition result includes a lecturer's name that matches a lecturer's name registered in the table, it is regarded that the lecturer's name has been specified. If not, it is regarded that the lecturer's name has not been specified.

In step S904, the keyword group selection module 130 searches the keyword group storage module 140 for a keyword group associated with the lecturer's name, by using the lecturer's name.

For example, the lecturer's name keyword group table 1000 is stored in the keyword group storage module 140. FIG. 10 is a diagram illustrating an example of the data structure of the lecturer's name keyword group table 1000. The lecturer's name keyword group table 1000 includes an ID column 1002, a type-of-context column 1004, the value-of-context column 1006, and a keyword group column 1008. The lecturer's name keyword group table 1000 is equivalent to the keyword group table 240, but the type-of-context column 1004 stores a lecturer's name.

In the searching for a keyword group performed by the keyword group selection module 130, the obtained lecturer's name is searched for in the value-of-context column 1006, and a keyword group related to the lecturer's name is extracted from the keyword group column 1008.

The process from step S906 is equivalent to the process from step S406 in the flowchart illustrated in FIG. 4.

In step S906, the character recognition module 115 performs character recognition on the still image.

In step S908, the word estimation module 120 cuts out character strings from a character string, which is a character recognition result.

In step S910, the word estimation module 120 extracts a word which has been extracted as a noun as a result of morphological analysis. Furthermore, the word estimation module 120 calculates the similarity between the character strings cut out in step S908 and the keywords included in the keyword group.

In step S912, the word output module 145 stores the word obtained through morphological analysis and the word obtained through calculation of similarity in the keyword group storage module 140.

In step S914, the word output module 145 outputs an analysis result.

In the process illustrated in the flowchart in FIG. 9, a result of character recognition that is performed on a still image included in a single moving image is corrected. Alternatively, the process may be performed on each of slide images included in a moving image.

Figure 11:
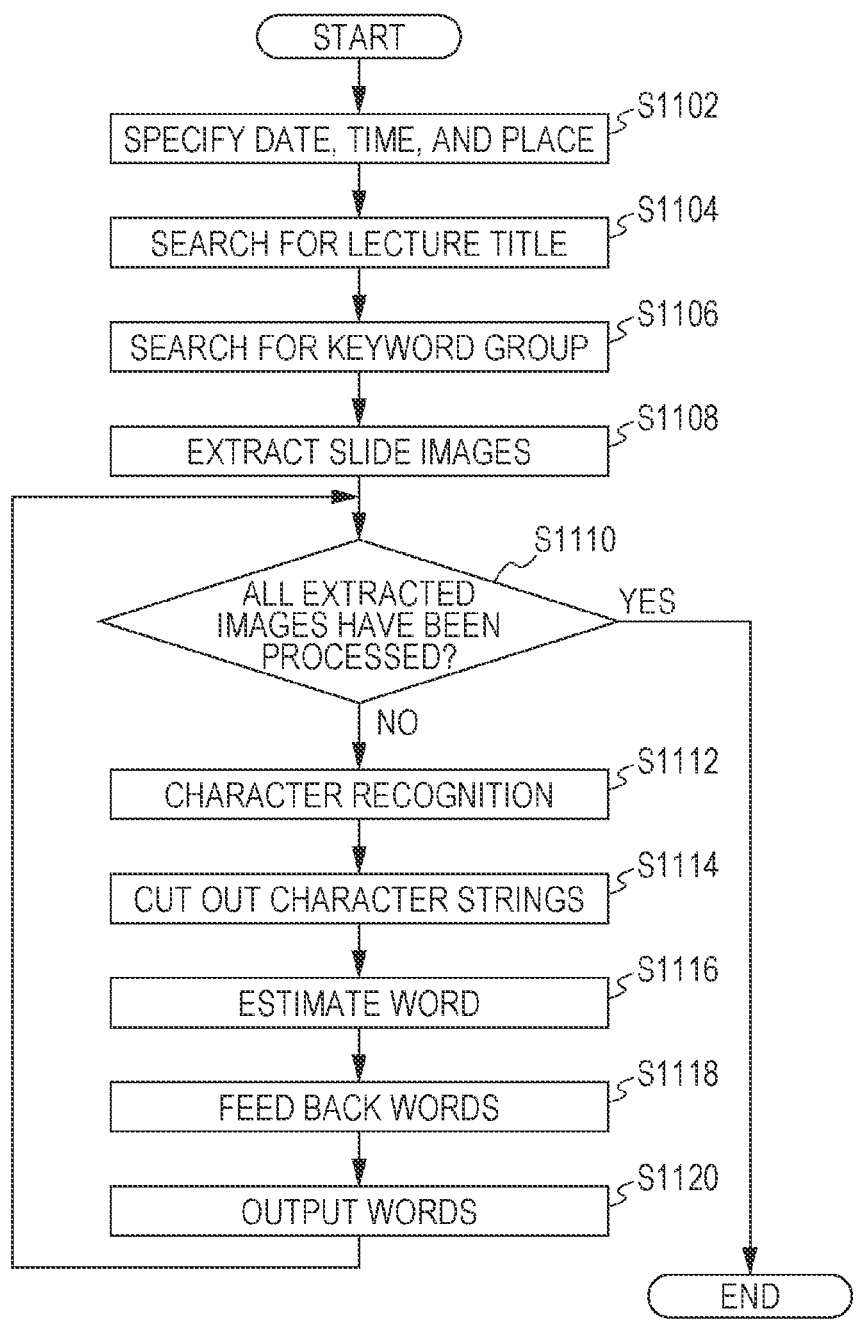
FIG. 11 is a flowchart illustrating an example of a process performed by a lecturer title specification module and so forth according to the exemplary embodiment.

FIG. 11 is a flowchart illustrating an example of a process performed by the lecture title specification module 320 and so forth according to the exemplary embodiment. The case of using a lecture title as context information will be described.

In step S1102, the lecture title specification module 320 obtains the shooting date and time and the shooting place of a moving image by using the method described above in the description of the process performed by the lecture title specification module 320.

In step S1104, the lecture title specification module 320 obtains a day of the week and time on the basis of the shooting date and time, and searches the timetable storage module 310 by using the place, day of the week, and time as keys, thereby obtaining a lecture title. A timetable 1200 and the like are stored in the timetable storage module 310. FIG. 12 is a diagram illustrating an example of the data structure of the timetable 1200 and the like. The timetable 1200 includes a time slot column 1202, a Monday column 1204, a Tuesday column 1206, a Wednesday column 1208, etc. Plural timetables (timetables 1200, 1220, and 1240) for individual grades are provided. The time slot column 1202 stores information about the starting times and end times of lectures. The Monday column 1204 stores information about lectures held on Monday and lecture rooms. The Tuesday column 1206 stores information about lectures held on Tuesday and lecture rooms. The Wednesday column 1208 stores information about lectures held on Wednesday and lecture rooms. The lecture title specification module 320 extracts a lecture title and a lecture room of the lecture held at the corresponding time on the corresponding day on the basis of the shooting date and time, and obtains a lecture title the shooting place for which matches the lecture room. Here, it may be determined whether or not a lecture title has been obtained. If obtained, the process may proceed to step S1106, and otherwise may proceed to step S1108.

In step S1106, the keyword group selection module 130 searches the keyword group storage module 140 for a keyword group associated with the lecture title, by using the lecture title.

Figures 13, 14:
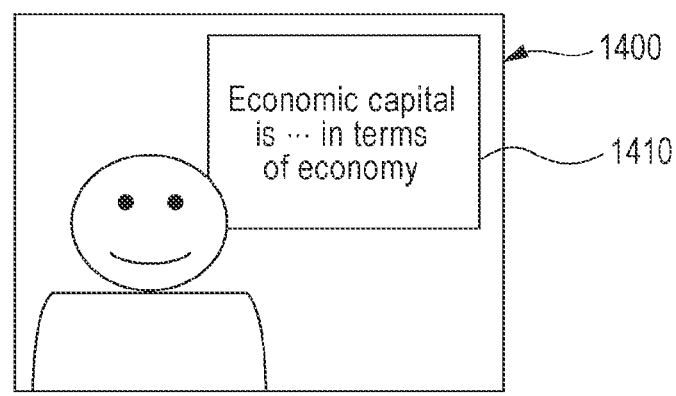
FIG. 13 is a diagram illustrating an example of the data structure of a lecture title keyword group table.
FIG. 14 is a diagram illustrating an example of a moving image and a slide image.

For example, description will be given of a case where a lecture title keyword group table 1300 is stored in the keyword group storage module 140 and "economy I" is specified as a lecture title. FIG. 13 is a diagram illustrating an example of the date structure of the lecture title keyword group table 1300. The lecture title keyword group table 1300 includes an ID column 1302, a type-of-context column 1304, a value-of-context column 1306, and a keyword group column 1308. The lecture title keyword group table 1300 is equivalent to the keyword group table 240, but the type-of-context column 1304 stores a lecture title.

In the searching for a keyword group performed by the keyword group selection module 130, the obtained lecture title is searched for in the value-of-context column 1306, and a keyword group related to the lecture title is extracted from the keyword group column 1308. Here, a keyword group including "economy", "market", "economic", and GDP" is extracted.

In step S1108, the slide image identifying module 110 analyzes a moving image, and extracts an image of slide projection as a still image (or a still image of a slide image in an image of slide projection). For example, description will be given of an example in which a slide image 1410 has been extracted as a still image. FIG. 14 is a diagram illustrating a moving image 1400 and the slide image 1410. The moving image 1400 includes the slide image 1410. The process from step S1110 is repeatedly performed for individual extracted still images.

In step S1110, it is determined whether or not all the extracted still images have been processed. If all the extracted still images have been processed, the process ends. Otherwise, the process proceeds to step S1112.

In step S1112, the character recognition module 115 performs character recognition on a still image. It is assumed that, for example, "Ecohomid capital is . . . in terms of economy" is obtained as a character recognition result for the slide image 1410 in the moving image 1400.

In step S1114, the word estimation module 120 cuts out character strings from a character string, which is the character recognition result. The word estimation module 120 performs morphological analysis on the character string obtained through the character recognition, and cuts out character strings so that each of the character strings has a length of a character string of a keyword obtained through the keyword searching in step S1106.

In the foregoing example of the character recognition result, "capital" and "economy" are extracted as nouns as a result of morphological analysis. The lengths of character strings of keywords "economy", "market", "economic", and "GDP" obtained through the searching for a keyword group in step S1106 are seven characters, six characters, eight characters, and three characters, respectively. Thus, the character strings "Eco, oho, omi, idc, cap, . . . and feconomy" are cut out.

In step S1116, the word estimation module 120 extracts words which have been extracted as nouns as a result of morphological analysis. Furthermore, the word estimation module 120 calculates the similarity between the character strings cut out in step S1114 and the keywords included in the keyword group. In this case, the amount of calculation may be reduced by comparing words having the same length. The similarity may be calculated by using a Levenshtein distance and the lengths of words.

Now, description will be given of calculation of the similarity between cutout character strings and keywords included in a keyword group. That is, description will be given of a specific example in which the amount of calculation is reduced by comparing words having the same length, and the similarity is calculated by using a Levenshtein distance and the length of a word. "Ecohomid" (a character string which is a character recognition result and has eight characters) is compared with "economic" (a keyword included in the keyword group). These two character strings are different from each other in two characters "h" and "d". Thus, the Levenshtein distance is 2, and the similarity is 0.25, which is obtained by dividing 2 by the length of the character string, i.e., 8. When the similarity is equal to or smaller than a predetermined threshold, the compared keyword is output as a candidate to the word output module 145. For example, when the threshold is 0.5, "economic" is output.

In step S1118, the word output module 145 stores, in the keyword group storage module 140, the words "capital" and "economy" obtained through morphological analysis and the keyword "economic" obtained through calculation of similarity. That is, "capital" is added to the keyword group column 1308 corresponding to "economy I" in the lecture title keyword group table 1300. "Economy" and "economic" are keywords that already exist in the keyword group column 1308.

In step S1120, the word output module 145 adds "economic", "capital", and "economy" as indexing information to the target moving image. Specifically, these keywords are indexed together with the moving image ID and the time when the slide image appeared.

In the process illustrated in the flowchart in FIG. 11, individual slide images included in a moving image are processed. Alternatively, a result of character recognition may be corrected for a still image included in a single moving image.

Figure 15:
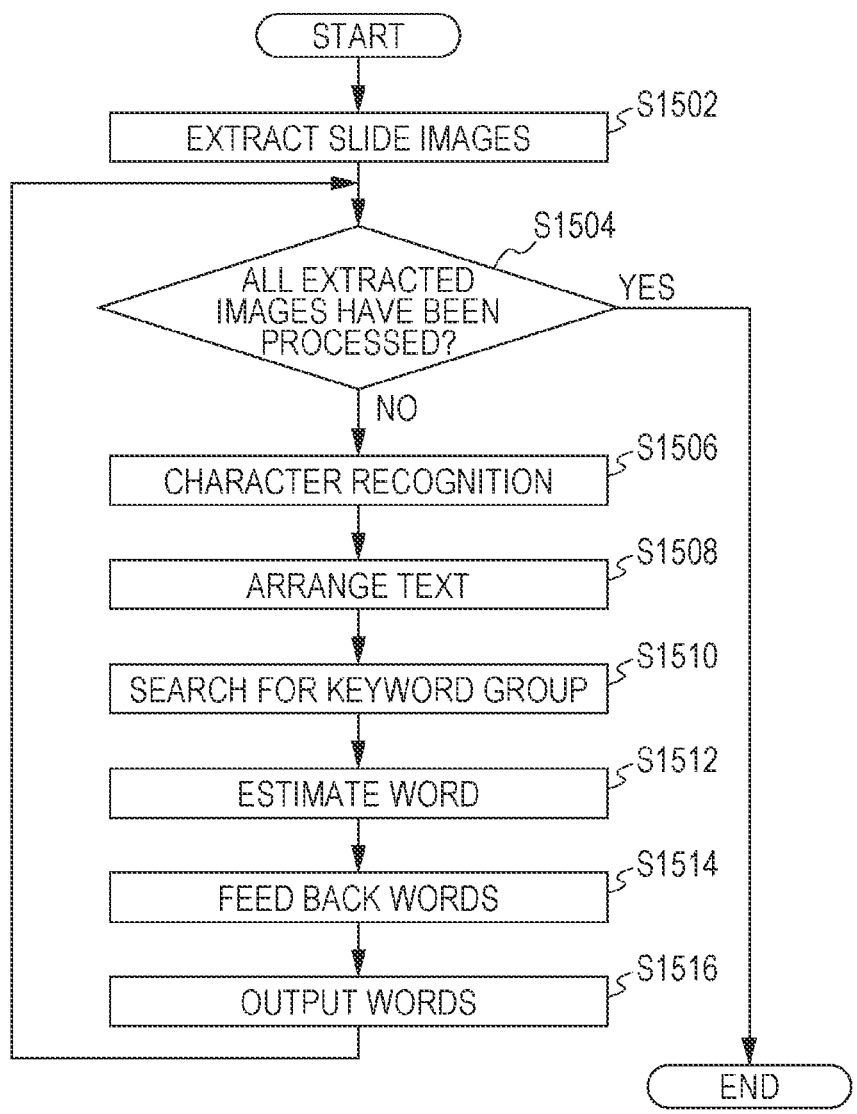
FIG. 15 is a flowchart illustrating an example of a process performed by a text group arrangement module and so forth according to the exemplary embodiment.

FIG. 15 is a flowchart illustrating an example of a process performed by the text group arrangement module 330 and so forth according to the exemplary embodiment. The case of using a text group as context information will be described.

Figures 16, 17:
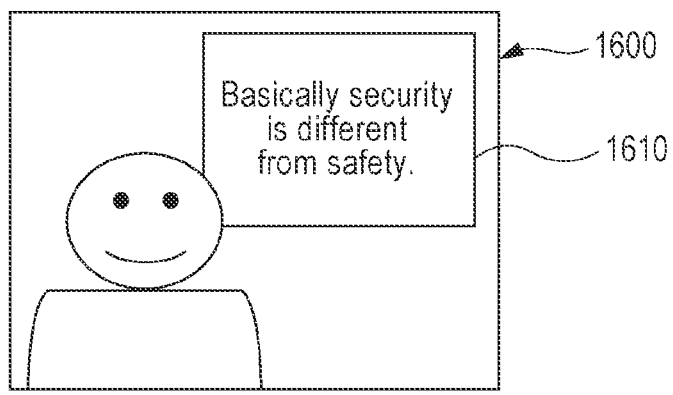
FIG. 16 is a diagram illustrating an example of a moving image and a slide image.
FIG. 17 is a diagram illustrating an example of the data structure of a text group keyword group table.

In step S1502, the slide image identifying module 110 analyzes a moving image, and extracts an image of slide projection as a still image (or a still image of a slide image in an image of slide projection). For example, description will be given of an example in which a slide image 1610 has been extracted as a still image. FIG. 16 is a diagram illustrating a moving image 1600 and the slide image 1610. The moving image 1600 includes the slide image 1610. The process from step S1504 is repeatedly performed for individual extracted still images.

In step S1504, it is determined whether or not all the extracted still images have been processed. If all the extracted still images have been processed, the process ends. Otherwise, the process proceeds to step S1506.

In step S1506, the character recognition module 115 performs character recognition on a still image. It is assumed that, for example, "Rasically sacμγify is dihherent frcm safety" is obtained as a character recognition result for the slide image 1610 in the moving image 1600.

In step S1508, the text group arrangement module 330 performs arrangement on the character recognition result. First, the text group arrangement module 330 performs morphological analysis on the character string as the character recognition result, thereby extracting a word. Furthermore, the text group arrangement module 330 extracts character strings having a predetermined length from the character recognition result. In the above-described example, a noun "safety" is extracted as a word. Then, character strings having four to fourteen characters are cut out. As a result, "Rasi, ical, llys, sacμ, μγif, fyis, rentfrcmsafety" is obtained.

In step S1510, the keyword group selection module 130 searches the keyword group storage module 140 for a keyword group by using the word extracted in step S1508 and/or the character string having the predetermined length.

For example, a text group keyword group table 1700 is stored in the keyword group storage module 140. FIG. 17 is a diagram illustrating the data structure of the text group keyword group table 1700. The text group keyword group table 1700 includes an ID column 1702, a type-of-context column 1704, and a keyword group column 1708. The text group keyword group table 1700 is equivalent to the keyword group table 240 without the value-of-context column 246. Alternatively, the text group keyword group table 1700 may include a column equivalent to the value-of-context column 246 which is vacant. The type-of-context column 1704 stores a text group.

In the searching performed in this case, it is not necessary that all the words and character strings match any one of the keywords stored in the keyword group column 1708, as long as the number of matches is a predetermined value or more, or the match frequency, which is obtained by dividing the number of matches by the number of keywords used in the searching, is a predetermined value or more. In the above-described example, "safety" matches (first row in the text group keyword group table 1700), and thus the keyword group included in the column (security, safety) is transmitted as a search result.

In step S1512, the word estimation module 120 extracts words which have been extracted as nouns as a result of morphological analysis. Furthermore, the word estimation module 120 calculates the similarity between the character strings extracted in step S1510 and the keywords included in the keyword group. In this case, the amount of calculation may be reduced by comparing words having the same length. The similarity may be calculated by using a Levenshtein distance and the length of a word.

Now, description will be given of calculation of the similarity between cutout character strings and keywords included in a keyword group. That is, description will be given of a specific example in which the amount of calculation is reduced by comparing words having the same length, and the similarity is calculated by using a Levenshtein distance and the length of a word. "Sacμγify", which is a character string as a character recognition result and has eight characters, is compared with "security", which is a keyword included in the keyword group. These two character strings are different from each other in four characters "a", "μ", "γ", and "f". Thus, the Levenshtein distance is 4, and the similarity is 0.5, which is obtained by dividing 4 by the length of the character string, i.e., 8. When the similarity is equal to or smaller than a predetermined threshold, the compared keyword is output as a candidate to the word output module 145. When the threshold is 0.5, "security" is output.

In step S1514, the word output module 145 stores, in the keyword group storage module 140, the word "safety" obtained through morphological analysis and the keyword "security" obtained through calculation of similarity. That is, "safety" and "security" are stored in the first row of the keyword group column 1708 in the text group keyword group table 1700. However, these keywords already exist there, and thus are not added.

In step S1516, the word output module 145 adds "safety" and "security" as indexing information to the target moving image. Specifically, these keywords are indexed together with the moving image ID and the time when the slide image appeared.

In the process illustrated in the flowchart in FIG. 15, individual slide images included in a moving image are processed. Alternatively, a result of character recognition may be corrected for a still image included in a single moving image.

Figure 18:
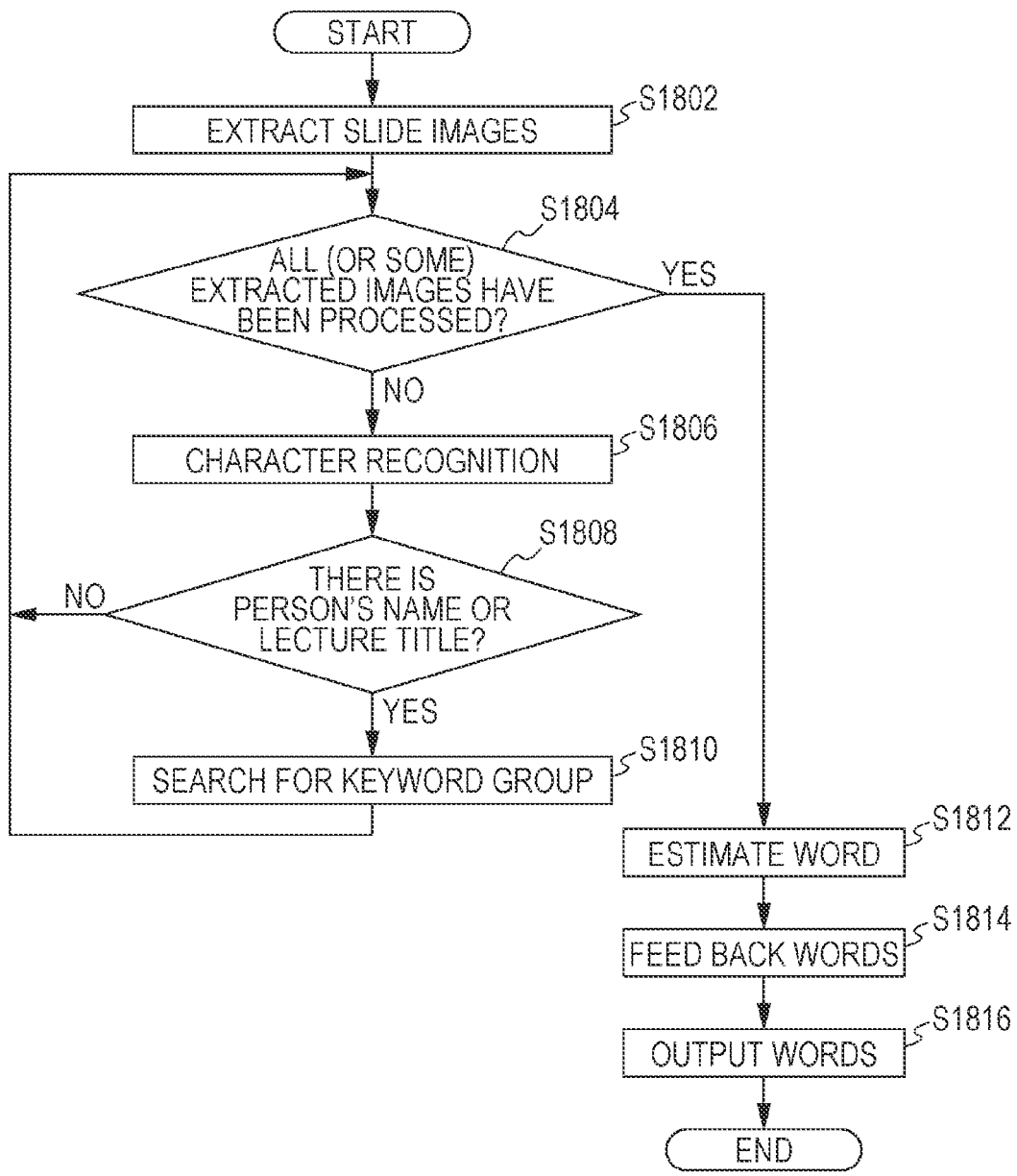
FIG. 18 is a flowchart illustrating an example of a process performed by a person's name extraction module, a lecture title extraction module, and so forth according to the exemplary embodiment.

FIG. 18 is a flowchart illustrating an example of a process performed by the person's name extraction module 340, the lecture title extraction module 350, and so forth according to the exemplary embodiment. The case of using a person's name or a lecture title as context information will be described.

Figures 19, 20:
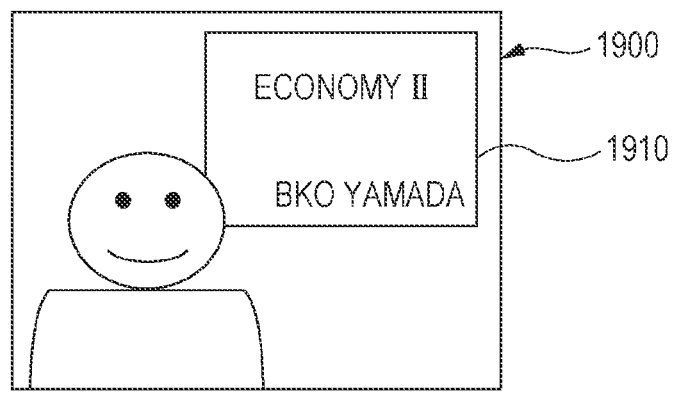
FIG. 19 is a diagram illustrating an example of a moving image and a slide image.
FIG. 20 is a diagram illustrating an example of the data structure of a person's name/lecture title keyword group table.
Figure 21:
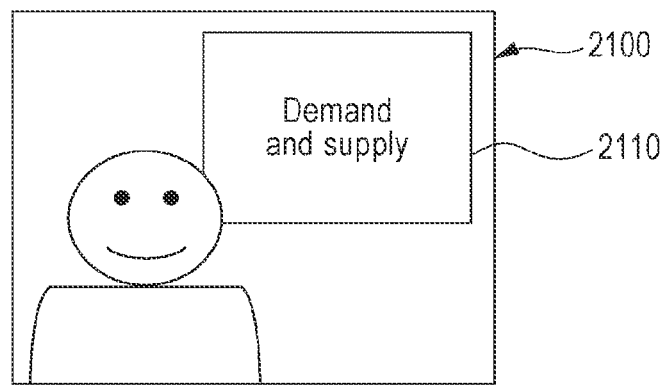
FIG. 21 is a diagram illustrating an example of a moving image and a slide image.

In step S1802, the slide image identifying module 110 analyzes a moving image, and extracts an image of slide projection as a still image (or a still image of a slide image in an image of slide projection). For example, description will be given of an example in which slide images 1910 and 2110 have been extracted as still images. FIG. 19 is a diagram illustrating a moving image 1900 and the slide image 1910. The moving image 1900 includes the slide image 1910. FIG. 21 is a diagram illustrating a moving image 2100 and the slide image 2110. The moving image 2100 includes the slide image 2110.

In step S1804, it is determined whether or not all (or some) extracted still images have been processed. If all (or some) extracted still images have been processed, the process proceeds to step S1812. Otherwise, the process proceeds to step S1806.

In step S1806, the character recognition module 115 performs character recognition on a still image. It is assumed that, for example, "ECONOMY II" and "BKO YAMADA" are obtained as a character recognition result for the slide image 1910 in the moving image 1900. It is also assumed that "Demand and subbjy" is obtained as a character recognition result for the slide image 2110 in the moving image 2100. Then, the lecture title extraction module 350 determines whether or not the character recognition results include a person's name or a lecture title that matches a person's name or a lecture title stored in a table that stores in advance persons' names and lecture titles (for example, a person's name/lecture title keyword group table 2000 described below, or a value-of-context column 2006 in the person's name/lecture title keyword group table 2000). The slide image 1910 includes a person's name and a lecture title, but the slide image 2110 includes neither of them.

In step S1808, it is determined whether or not there is a person's name or a lecture title. If there is a person's name or a lecture title, the process proceeds to step S1810. Otherwise, the process returns to step S1804. Step S1810 is performed on the slide image 1910.

If there are plural persons' names or plural lecture titles (if a single still image includes plural persons' names or plural lecture titles, or if plural persons' names or plural lecture titles are extracted as a result of performing character recognition on plural still images), weighting based on the temporal position of a still image (the above-described page number) may be performed, and a person's name or a lecture title may be selected using the result of the weighting. In the weighting, for example, a value "1" may be assigned to a case where a person's name or a lecture title is in the still image of the first page or the last page, a value "0" may be assigned to a case where a person's name or a lecture title is in the still image of the other pages, and a person's name or a lecture title on the first page or the last page may be selected. Alternatively, under the assumption that a person's name which appears first is likely to be a lecturer's name, a value "10" may be assigned to a case where a person's name or a lecture title is in the still image of the first page, and the value may be decremented by one every time the page number proceeds forward. Alternatively, a value "10" may be assigned to a case where a person's name or a lecture title is in the still image of the last page, and the value may be decremented by one every time the page number returns backward.

In step S1810, the keyword group selection module 130 searches the keyword group storage module 140 for a keyword group associated with the person's name and/or the lecture title, by using the person's name and/or the lecture title.

For example, the person's name/lecture title keyword group table 2000 is stored in the keyword group storage module 140. FIG. 20 is a diagram illustrating an example of the data structure of the person's name/lecture title keyword group table 2000. The person's name/lecture title keyword group table 2000 includes an ID column 2002, a type-of-context column 2004, a value-of-context column 2006, and a keyword group column 2008. The person's name/lecture title keyword group table 2000 is equivalent to the keyword group table 240, but the type-of-context column 2004 stores a person's name or a lecture title.

In the case of searching for a keyword group by using a person's name, a keyword group associated with the person's name in the type-of-context column 2004 and the same name in the value-of-context column 2006 is searched for. For example, when a keyword group is searched for by using "BKO YAMADA" as a person's name, "demand", "supply", "market", and "index" stored in the keyword group column 2008 are obtained as a search result.

The foregoing process may be performed on all images or some images. If plural results are obtained, obtained keyword groups are merged.

In step S1812, the word estimation module 120 estimates a word. First, the word estimation module 120 performs morphological analysis on a character string, which is a character recognition result of each still image, and extracts a word. Furthermore, the word estimation module 120 extracts character strings having a predetermined length from the character recognition result. In the above-described example, the noun "demand" is extracted as a word from the character recognition result of the slide image 2110. The lengths of the character strings of the keywords "demand", "supply", "market", and "index" obtained through the searching for a keyword group in step S1810 are six characters, six characters, six characters, and five characters, respectively. Thus, character strings "demand, dandsu, ubbjy, deman, ndand, dsubb, . . . " are cut out.

Description will be given of calculation of the similarity between the cut out character strings and the keywords included in the keyword group. In this case, the amount of calculation may be reduced by comparing words having the same length. Calculation of similarity is performed by using a Levenshtein distance and the length of a word. Specifically, "subbjy" (a character string serving as a character recognition result and having six characters) is compared with "supply" (a keyword included in the keyword group). These two character strings are different from each other in three characters "b, b, and j". Thus, the Levenshtein distance is 3, and the similarity is 0.5, which is obtained by dividing 3 by the length of the character string, i.e., 6. When the similarity is equal to or smaller than a predetermined threshold, the compared keyword is output as a candidate to the word output module 145. When the threshold is 0.5, the word "supply" is output.

In step S1814, the word output module 145 stores, in the keyword group storage module 140, the word "demand" obtained through the morphological analysis and the word "supply" obtained through calculation of similarity. That is, the word output module 145 stores the words "demand" and "supply" in the keyword group column 2008 corresponding to "BKO YAMADA" in the person's name/lecture title keyword group table 2000. However, these words are already stored, and thus no words are added in this case.

In step S1816, the word output module 145 adds the words "demand" and "supply" as indexing information to the target moving image. Specifically, these keywords are indexed together with the moving image ID and the time when the slide image appeared.

Figure 22:
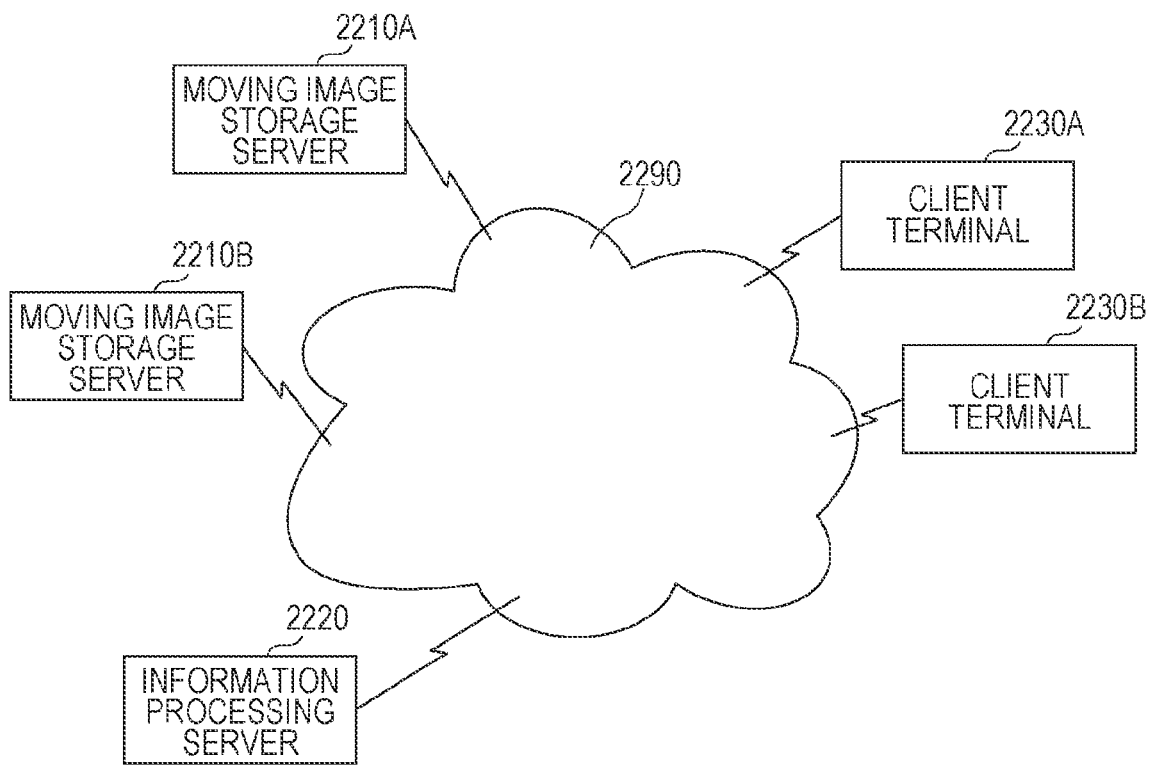
FIG. 22 is a diagram illustrating an example system configuration in a case where the exemplary embodiment is realized.

FIG. 22 is a diagram illustrating an example system configuration in a case where the exemplary embodiment is realized.

A moving image storage server 2210A, a moving image storage server 2210B, an information processing server 2220, a client terminal 2230A, and a client terminal 2230B are connected to one another via a communication line 2290. The moving image storage servers 2210A and 2210B are provided with the moving image storage module 100 illustrated in FIG. 1. The information processing server 2220 is provided with the moving image reading module 105, the slide image identifying module 110, the character recognition module 115, the word estimation module 120, the context obtaining module 125, the keyword group selection module 130, the keyword group storage module 140, the word output module 145, and the word storage module 150 illustrated in FIG. 1. The client terminals 2230A and 2230B search the word storage module 150 in the information processing server 2220, obtain a desired moving image from the moving image storage server 2210A or 2210B, and play back the moving image.

Figure 23:
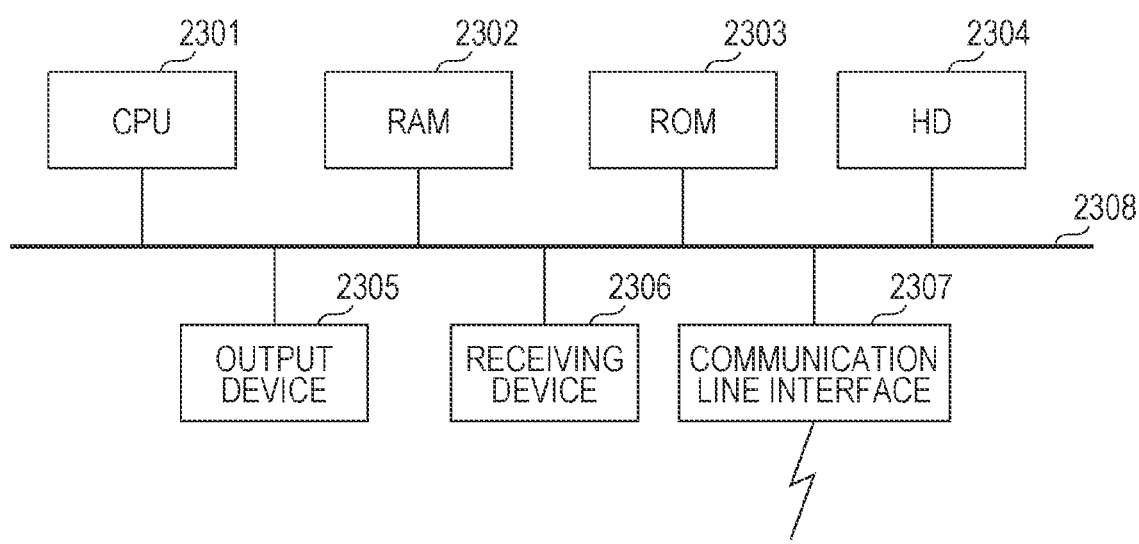
FIG. 23 is a block diagram illustrating an example hardware configuration of a computer that realizes the exemplary embodiment.

The hardware configuration of a computer that executes a program according to the exemplary embodiment is that of a typical computer, as illustrated in FIG. 23, specifically, a personal computer or a computer serving as a server. That is, a central processing unit (CPU) 2301 is used as a processing unit (operating unit), and a random access memory (RAM) 2302, a read only memory (ROM) 2303, and a hard disk (HD) 2304 are used as a storage device. A hard disk may be used as the HD 2304. The computer illustrated in FIG. 23 includes the CPU 2301, which executes a program corresponding to the moving image reading module 105, the slide image identifying module 110, the character recognition module 115, the word estimation module 120, the context obtaining module 125, the keyword group selection module 130, the word output module 145, the person recognition module 210, the moving image ID/page number recognition module 220, the lecturer's name recognition module 230, the lecture title specification module 320, the text group arrangement module 330, the person's name extraction module 340, the lecture title extraction module 350, etc.; the RAM 2302 that stores the program and data; the ROM 2303 that stores a program for activating the computer; the HD 2304 serving as an auxiliary storage device; a receiving device 2306 that receives data on the basis of an operation performed on a keyboard, mouse, touch panel, or the like by a user; an output device 2305 such as a cathode ray tube (CRT) or a liquid crystal display; a communication line interface 2307 for connecting to a communication network, such as a network interface card; and a bus 2308 for connecting these devices so that data may be transmitted and received among the devices. Plural computers, each having the above-described configuration, may be connected to one another via a network.

In the above-described exemplary embodiment, the modules based on a computer program are realized by causing the system of this hardware configuration to read the computer program serving as software, and by causing software and hardware resources to cooperate with each other.

The hardware configuration illustrated in FIG. 23 is one example configuration. The exemplary embodiment is not limited to the configuration illustrated in FIG. 23, and another configuration may be used as long as the modules described above in the exemplary embodiment may be executed. For example, some of the modules may be configured by dedicated hardware (for example, an application specific integrated circuit (ASIC)), and some of the modules may be included in an external system and connected via a communication line. Furthermore, plural systems, each having the configuration illustrated in FIG. 23, may be connected to one another via a communication line and may operate in cooperation with one another. In particular, the system illustrated in FIG. 23 may be incorporated in an information appliance, a copier, a facsimile, a scanner, a printer, a multifunction peripheral (an image processing apparatus having any two of scanner, printer, copier, and facsimile functions), or the like, instead of the personal computer.

Alternatively, a combination of the above-described processes may be used (for example, a combination of the modules in the context obtaining module 125 illustrated in FIGS. 2 and 3, and a combination of the flowcharts illustrated in FIGS. 4, 7, 9, 11, 15, and 18). In that case, the word output module 145 may select a result of each process by using logical operation (AND operation, OR operation, or the like). Also, a technique according to the related art may be adopted for a process performed by each module.

The above-described program may be provided by being stored in a recording medium, or may be provided via a communication unit. In that case, for example, the above-described program may be regarded as a "computer readable recording medium having the program recorded thereon".

The "computer readable recording medium having the program recorded thereon" is a computer readable recording medium having the program recorded thereon, which is used for installing, executing, or circulating the program.

The following are examples of the recording medium: a DVD-R, a DVD-RW, a DVD-RAM, and the like, which are digital versatile discs (DVDs) and standards established by the DVD forum; a DVD+R, a DVD+RW, and the like, which are standards established by the DVD+RW; compact discs (CDs) such as a read only memory (CD-ROM), a CD recordable (CD-R), and a CD rewritable (CD-RW); a Blu-ray Disc (registered trademark); a magneto-optical (MO) disc; a flexible disk (FD); a magnetic tape; a hard disk; a read only memory (ROM); an electrically erasable, programmable read only memory (EEPROM, registered trademark); a flash memory; a random access memory (RAM); and a secure digital (SD) memory card.

The above-described program or a part of the program may be recorded on the recording medium and may be stored or circulated. Also, the program or a part of the program may be transmitted using a transmission medium, such as a wired network including a local area network (LAN), a metropolitan area network (MAN), a wide area network (WAN), the Internet, an intranet, and an extranet, or a wireless communication network, or a combination of the wired and wireless networks, or may be carried using a carrier.

Furthermore, the above-described program may be a part of another program, or may be recorded on a recording medium together with another program. Alternatively, the program may be recorded on plural recording media in a divided manner. The program may be recorded in any form as long as the program is recoverable, for example, the program may be compressed or encrypted.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    an identifying unit comprising a processor that identifies a still image included in a moving image;
    a character recognition unit comprising a processor that performs character recognition on the still image identified by the identifying unit;
    an obtaining unit comprising a processor that obtains information about the moving image from the moving image;
    a correcting unit comprising a processor that corrects, on the basis of the information obtained by the obtaining unit, a character recognition result generated by the character recognition unit; and
    an output unit comprising a processor that outputs the character recognition result corrected by the correcting unit in association with the moving image.

2. The information processing apparatus according to claim 1,
    wherein the obtaining unit recognizes a person in the moving image and obtains information about the person, and
    wherein the correcting unit corrects the character recognition result on the basis of the information about the person obtained by the obtaining unit.

3. The information processing apparatus according to claim 1,
    wherein the obtaining unit obtains, on the basis of moving image identification information, which is information for identifying the moving image, or on the basis of the moving image identification information and a temporal position of the still image identified by the identifying unit, character information that is likely to be included in the still image, and
    wherein the correcting unit corrects the character recognition result on the basis of the character information obtained by the obtaining unit.

4. The information processing apparatus according to claim 1,
    wherein the obtaining unit extracts a person's name included in a character recognition result generated for the still image at a predetermined temporal position by the character recognition unit, and obtains information about the person's name, and
    wherein the correcting unit corrects, on the basis of the information about the person's name obtained by the obtaining unit, the character recognition result generated by the character recognition unit.

5. The information processing apparatus according to claim 1,
wherein the obtaining unit extracts information about a shooting place and shooting date and time of the moving image, and obtains information about an event held in the shooting place on the shooting date and time, and
wherein the correcting unit corrects, on the basis of the information about the event obtained by the obtaining unit, the character recognition result generated by the character recognition unit.

6. The information processing apparatus according to claim 1,
wherein the obtaining unit performs morphological analysis on the character recognition result generated by the character recognition unit, and obtains information about a character string, which is a result of the morphological analysis, or about a character string similar to the character string, and
wherein the correcting unit corrects, on the basis of the information about the character string obtained by the obtaining unit, the character recognition result generated by the character recognition unit.

7. The information processing apparatus according to claim 1,
wherein the obtaining unit extracts a person's name or an event title included in the character recognition result generated by the character recognition unit, and, if the character recognition result includes a plurality of persons' names or a plurality of event titles, the obtaining unit performs weighting on the basis of a temporal position of the still image, and obtains information about a person's name or an event title selected using a result of the weighting, and
wherein the correcting unit corrects, on the basis of the information about the person's name or the event title obtained by the obtaining unit, the character recognition result generated by the character recognition unit.

8. An image processing method comprising:
identifying a still image included in a moving image;
performing character recognition on the identified still image;
obtaining information about the moving image from the moving image;
correcting, on the basis of the obtained information, a character recognition result generated in the character recognition; and
outputting the corrected character recognition result in association with the moving image.

9. A non-transitory computer readable medium storing an information processing program causing a computer to execute a process, the process comprising:
identifying a still image included in a moving image;
performing character recognition on the identified still image;
obtaining information about the moving image from the moving image;
correcting, on the basis of the obtained information, a character recognition result generated in the character recognition; and
outputting the corrected character recognition result in association with the moving image.

* * * * *